US012558968B2

(12) United States Patent
Chetty et al.

(10) Patent No.: US 12,558,968 B2
(45) Date of Patent: Feb. 24, 2026

(54) VIBRATIONAL ORDER ATTENUATION IN AN ELECTRIC MOTOR

(71) Applicant: Atieva, Inc., Newark, CA (US)

(72) Inventors: Aditya Chetty, Fremont, CA (US);
Florian Dianoux, Fremont, CA (US)

(73) Assignee: Atieva, Inc., Newark, CA (US)

( * ) Notice: Subject to any disclaimer, the term of this patent is extended or adjusted under 35 U.S.C. 154(b) by 2 days.

(21) Appl. No.: 18/703,991

(22) PCT Filed: Oct. 25, 2022

(86) PCT No.: PCT/US2022/078670
§ 371 (c)(1),
(2) Date: Apr. 23, 2024

(87) PCT Pub. No.: WO2023/076911
PCT Pub. Date: May 4, 2023

(65) Prior Publication Data
US 2025/0001874 A1     Jan. 2, 2025

Related U.S. Application Data

(60) Provisional application No. 63/263,250, filed on Oct. 29, 2021.

(51) Int. Cl.
*B60L 15/20*          (2006.01)
*G01H 1/00*          (2006.01)

(52) U.S. Cl.
CPC .............. *B60L 15/20* (2013.01); *G01H 1/003* (2013.01); *B60L 2240/421* (2013.01); *B60L 2240/423* (2013.01); *B60L 2270/145* (2013.01)

(58) Field of Classification Search
CPC .............. B60L 15/20; B60L 2240/421; B60L 2240/423; B60L 2270/145; G01H 1/003
See application file for complete search history.

(56) References Cited

U.S. PATENT DOCUMENTS 3,693,402 A      9/1972   Jones
3,762,226 A  *  10/1973   Davis ..................... G01C 21/18
74/5 F (Continued)

FOREIGN PATENT DOCUMENTS

| EP | 2221236 A1 | 8/2010 |
| EP | 3257728 A1 | 12/2017 |
| WO | 2006120550 A2 | 11/2006 |

OTHER PUBLICATIONS

International Search Report and Written Opinion for PCT Application No. PCT/US2022/078670, mailed on Apr. 4, 2023, 11 pages.

(Continued)

*Primary Examiner* — Gertrude Arthur Jeanglaude
(74) *Attorney, Agent, or Firm* — Brake Hughes Bellermann LLP

(57)          ABSTRACT

In a general aspect, a method can include applying, by a motor controller, a filter to a signal indicating rotational speed of an electric motor to detect an order of vibration of the electric motor to be attenuated. The method can also include providing the filtered signal to a proportional derivative controller, and generating, by the proportional derivative controller, an attenuation signal for attenuating vibration associated with the detected order of vibration. The method can still further include combining the attenuation signal with a torque command signal to produce a combined torque command signal. The torque command signal can indicate an amount of torque requested from the electric motor. The method can further include producing torque with the electric motor based on the combined torque command signal.

18 Claims, 3 Drawing Sheets

(56)                    References Cited

U.S. PATENT DOCUMENTS

| | | | | |
|---|---|---|---|---|
| 6,181,020 | B1 * | 1/2001 | Uchida ................. | B60W 30/18 |
| | | | | 290/40 C |
| 6,441,506 | B2 * | 8/2002 | Nakashima ........... | B60W 10/06 |
| | | | | 290/40 C |
| 7,292,917 | B2 * | 11/2007 | Kuang ................... | B60K 6/445 |
| | | | | 180/65.285 |
| 8,285,432 | B2 * | 10/2012 | Heap ...................... | B60K 6/365 |
| | | | | 180/65.21 |
| 8,598,643 | B2 * | 12/2013 | Kawasaki ............ | H10D 30/693 |
| | | | | 257/305 |
| 2006/0025906 | A1 | 2/2006 | Syed et al. | |
| 2018/0347676 | A1 | 12/2018 | Lahr et al. | |

OTHER PUBLICATIONS

Extended European Search Report for European Application No. 22888440.9, dated Nov. 21, 02025, 10 pages.

* cited by examiner

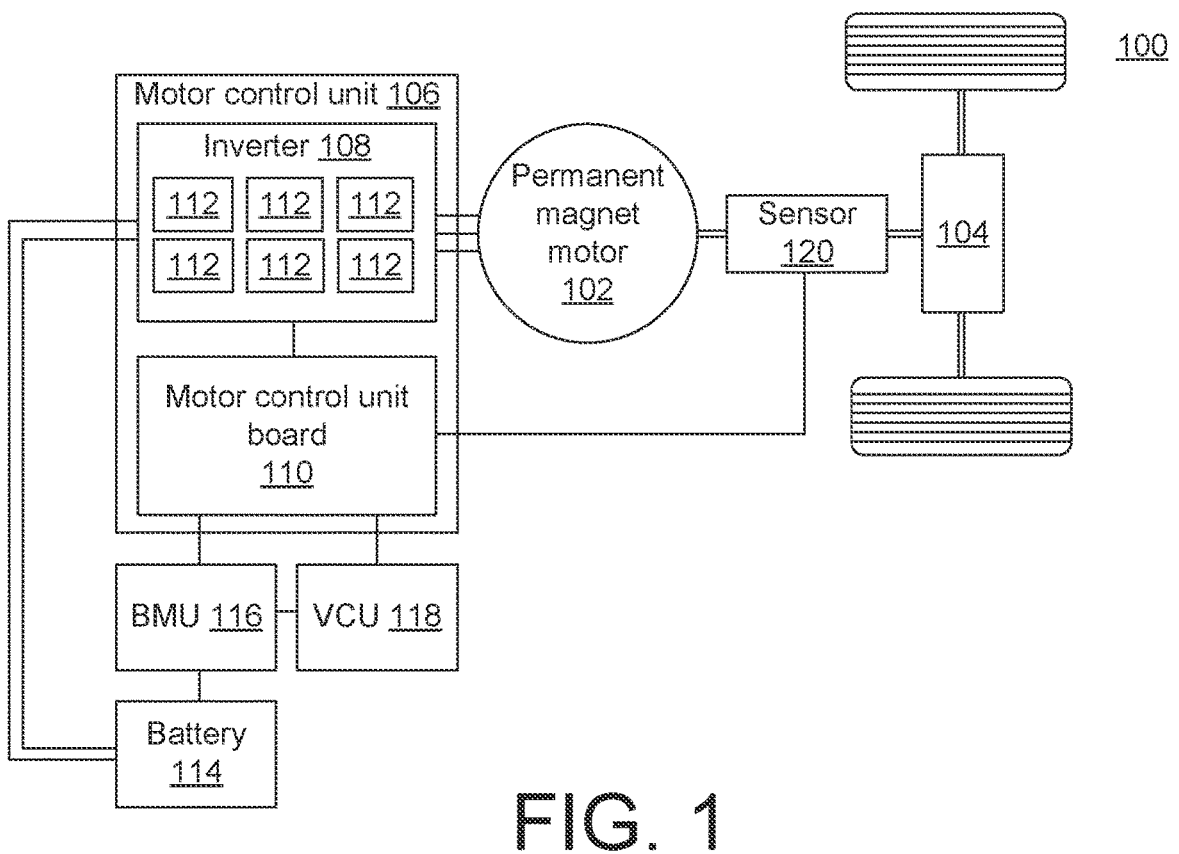
FIG. 1
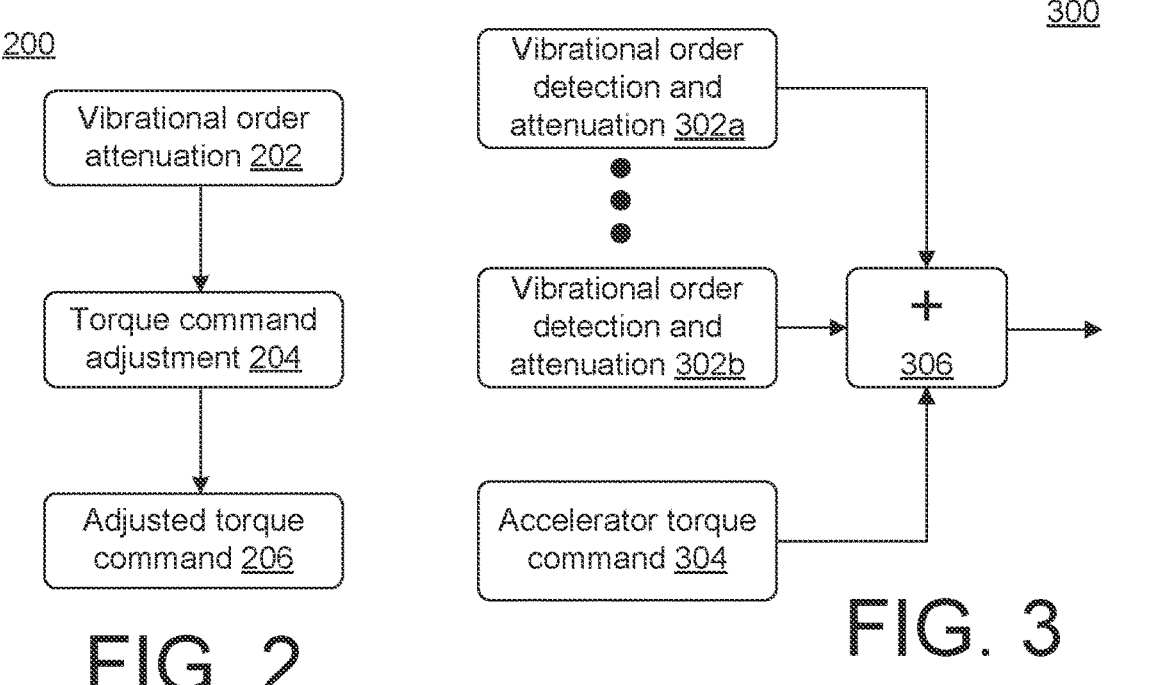
FIG. 2
FIG. 3

VIBRATIONAL ORDER ATTENUATION IN AN ELECTRIC MOTOR

CROSS-REFERENCE TO RELATED APPLICATIONS

This application is a 35 U.S.C. § 371 National Phase Entry Application from PCT Application No. PCT/US2022/078670, filed on Oct. 25, 2022, entitled "VIBRATIONAL ORDER ATTENUATION IN AN ELECTRIC MOTOR", and designating the U.S., which claims the priority benefit of U.S. Provisional Application No. 63/263,250, entitled "VIBRATIONAL ORDER ATTENUATION IN AN ELECTRIC MOTOR", filed Oct. 29, 2021, the disclosures of which are hereby incorporated by reference in their entireties.

TECHNICAL FIELD

This document relates to attenuating vibration in an electric motor.

BACKGROUND

In recent years, electric vehicle (EV) technology has continued to develop, and an increasing number of people are choosing to have an EV as a personal vehicle. Motors used in EVs (e.g., permanent magnet motors, induction motors, etc.) can have one or more vibrational orders associated with their operation. Vibration associated with these vibrational orders can be perceived by occupants of an associated EV, which can detract from the occupants' experience.

SUMMARY

In a general aspect, a method includes applying, by a motor controller, a filter to a signal indicating rotational speed of an electric motor to detect an order of vibration of the electric motor to be attenuated. The method also includes providing the filtered signal to a proportional derivative controller, and generating, by the proportional derivative controller, an attenuation signal for attenuating vibration associated with the detected order of vibration. The method further includes combining the attenuation signal with a torque command signal to produce a combined torque command signal, where the torque command signal indicates an amount of torque requested from the electric motor. The method also includes producing torque with the electric motor based on the combined torque command signal.

Implementations can include one or more of the following features, or any combination thereof. For example, the proportional derivative controller can be configured to implement a disturbance rejection loop with a zero reference.

The signal indicating rotational speed of the electric motor can indicate an absolute value of the rotational speed.

Applying the filter to the signal indicating rotational speed of the electric motor can include, prior to determining the absolute value of the rotational speed, low-pass filtering the signal indicating rotational speed of the electric motor and, after determining the absolute value of the rotational speed, notch filtering the signal indicating the absolute value of the rotational speed.

The method can include enabling the proportional derivative controller in response to the rotational speed being between a lower speed limit and an upper speed limit, and an amount of torque requested by the torque command signal being greater than or equal to a threshold. Otherwise, the method can include disabling the proportional derivative controller.

In another general aspect, a method includes, based on a rotational speed of an electric motor, detecting a first vibrational order of the electric motor to be attenuated, and detecting a second vibrational order of the electric motor to be attenuated. The method also includes, based on the detection of the first vibrational order, producing a first attenuation signal for attenuating vibration associated with the first vibrational order. The method further includes, based on the detection of the second vibrational order, producing a second attenuation signal for attenuating vibration associated with the second vibrational order. The method also includes combining the first attenuation signal and the second attenuation signal with a torque command signal to produce a combined torque command signal. The torque command signal indicates an amount of torque requested from the electric motor. The method further includes producing torque with the electric motor based on the combined torque command signal.

Implementations can include one or more of the following features, or any combination thereof. For example, the method can include disabling a first proportional derivative controller used to produce the first attenuation signal unless the rotational speed is between a first lower speed limit and a first upper speed limit, and an amount of torque requested by the torque command signal is above a first threshold. The method can include disabling a second proportional derivative controller used to produce the second attenuation signal unless the rotational speed is between a second lower speed limit and a second upper speed limit, and an amount of torque requested by the torque command signal is above a second threshold. At least one of the first proportional derivative controller, or the second proportional derivative controller can be configured to implement a respective disturbance rejection loop with a zero reference.

The rotational speed of the electric motor can be an absolute value of rotational speed.

In another general aspect, a vehicle includes an electric motor configured to generate a signal indicating a rotational speed of the electric motor. The vehicle also includes a motor controller including a filter configured to filter the signal indicating rotational speed of an electric motor to produce a filtered signal used to detect an order of vibration of the electric motor to be attenuated. The motor controller includes a proportional derivative controller configured to generate, based on the filtered signal, an attenuation signal for attenuating vibration associated with the detected order of vibration. The motor controller is configured to combine the attenuation signal with a torque command signal to produce a combined torque command signal. The torque command signal indicates an amount of torque requested from the electric motor. The electric motor is configured to produce torque based on the combined torque command signal.

Implementations can include one or more of the following features, or any combination thereof. For example, the proportional derivative controller can be configured to implement a disturbance rejection loop with a zero reference.

The filtered signal can indicate an absolute value of the rotational speed.

The filter can be configured to produce the filtered signal by, prior to determining the absolute value of the rotational speed, low-pass filtering the signal indicating rotational speed of the electric motor and, after determining the absolute value of the rotational speed, notch filtering the signal indicating the absolute value of the rotational speed.

The motor controller can be configured to enable the proportional derivative controller in response to the rotational speed being between a lower speed limit and an upper speed limit, and an amount of torque requested by the torque command signal being greater than or equal to a threshold. Otherwise, the motor controller can be configured disable the proportional derivative controller.

In another general aspect, a vehicle includes an electric motor configured to indicate a rotational speed. The vehicle also includes a motor controller configured to, based on the rotational speed, detect a first vibrational order of the electric motor to be attenuated. The motor controller is also configured to, based on the rotational speed, detect a second vibrational order of the electric motor to be attenuated. The motor controller is further configured to, based on the detection of the first vibrational order, produce a first attenuation signal for attenuating vibration associated with the first vibrational order and, based on the detection of the second vibrational order, produce a second attenuation signal for attenuating vibration associated with the second vibrational order. The motor controller is further configured to combine the first attenuation signal and the second attenuation signal with a torque command signal to produce a combined torque command signal, the torque command signal indicating an amount of torque requested from the electric motor. The electric motor is configured to produce torque based on the combined torque command signal.

Implementations can include one or more of the following features, or any combination thereof. For example, the motor controller can be configured to disable a first proportional derivative controller used to produce the first attenuation signal unless the rotational speed is between a first lower speed limit and a first upper speed limit, and an amount of torque requested by the torque command signal is above a first threshold. The motor controller can be configured to disable a second proportional derivative controller used to produce the second attenuation signal unless the rotational speed is between a second lower speed limit and a second upper speed limit, and an amount of torque requested by the torque command signal is above a second threshold.

At least one of the first proportional derivative controller, or the second proportional derivative controller can be configured to implement a respective disturbance rejection loop with a zero reference.

The motor controller can be further configured to determine an absolute value of the rotational speed prior to determining the first vibrational order and the second vibrational order.

BRIEF DESCRIPTION OF DRAWINGS

FIG. 1 shows an example of a vehicle having a permanent magnet motor.

FIG. 2 shows an example of vibration order attenuation that can be performed by the motor controller of the vehicle in FIG. 1.

FIG. 3 shows an example of attenuation of multiple orders of vibration that can be performed by the motor controller of the vehicle in FIG. 1.

Like reference symbols in the various drawings indicate like elements.

DETAILED DESCRIPTION

Figure 4:
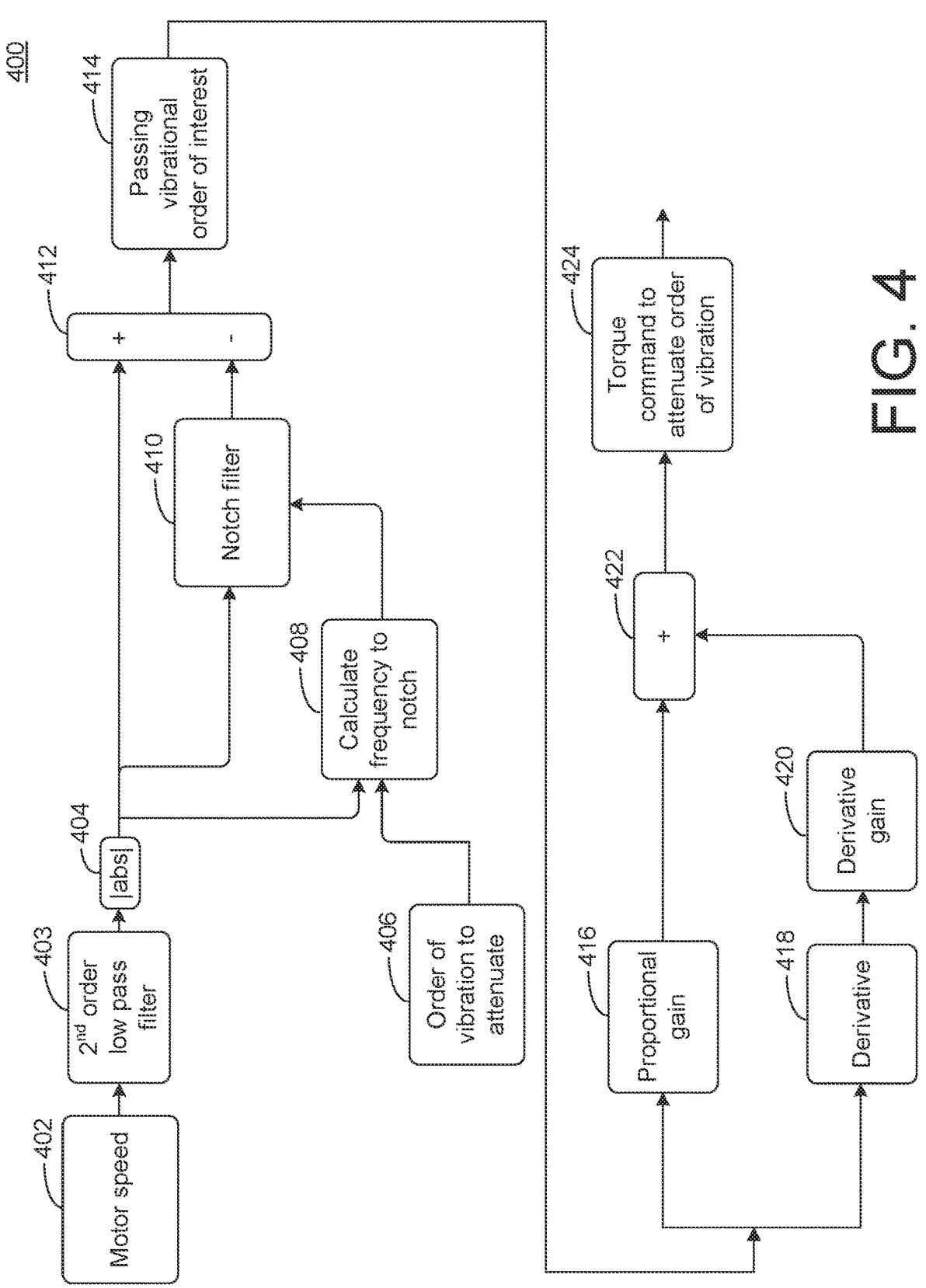
FIG. 4 shows an example of a motor control process that can be performed by the motor controller of the vehicle in FIG. 1 to attenuate vibration associated with an order of vibration.

This document describes examples of systems and techniques for attenuating (dampening) the effects of vibrational orders, such as vibrational orders of an electric motor in a vehicle, e.g., an electric vehicle (EV). In example implementations, a motor control unit can implement a motor control strategy that includes such vibrational order attenuation. For purposes of this disclosure, the terms vibrational order, order of vibration, and the like, are used interchangeably.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An EV can be powered exclusively by electricity, or can use one or more other energy sources in addition to electricity, such as petroleum, diesel fuel, or natural gas, to name just a few examples. As used herein, an EV includes an onboard energy storage, sometimes referred to as a battery pack, to power one or more electric motors. Two or more EVs can have different types of energy storages, and/or different sizes thereof.

FIG. 1 shows an example of a vehicle 100 having a permanent magnet motor 102. The permanent magnet motor 102 is given by way of example and, in some implementations, other type of motors can be used, such as induction motors. In this example, the permanent magnet motor 102 and/or other components of the vehicle 100 can be used with one or more other examples described elsewhere herein. Only portions of the vehicle 100 are shown, for simplicity. The permanent magnet motor 102 has one or more magnets positioned within, or on a surface of a rotor. The permanent magnet motor 102 can apply current to a stator surrounding the rotor to generate torque for one or more drive wheels. In some implementations, gears 104 can be provided between the permanent magnet motor 102 and the drive wheel(s). For example, the gears 104 can include a differential and/or can provide gear reduction.

The vehicle 100 can use a motor controller to operate the permanent magnet motor 102 as well as other components. Here, the vehicle 100 includes a motor control unit (MCU) 106 that includes an inverter 108 and an MCU board 110. The MCU board 110 controls the inverter 108. The MCU board 110 can include one or more processing components. In some implementations, the MCU board 110 includes one or more processors. For example, the MCU board 110 can also include one or more field-programmable gate arrays. The MCU 106 can also include one or more other components for controlling the permanent magnet motor 102. For example, gate drivers, shunt monitors, and cooling features can be included.

The inverter 108 can include one or more power stages to convert direct current (DC) to alternating current (AC) to drive the permanent magnet motor 102, and to convert AC to DC when recovering energy from the permanent magnet motor 102. The inverter 108 can use transistors 112 that are toggled on and off repeatedly to generate AC for, or recover energy from, the permanent magnet motor 102. In some implementations, six of the transistors 112 can be coupled in respective pairs to produce three-phase AC. The transistors 112 can be metal-oxide semiconductor field-effect transistors (MOSFETs), for example, silicon carbide MOSFETs. In some implementations, insulated-gate bipolar transistors (IGBTs) can be used.

The vehicle 100 includes a battery 114. The battery 114 can include one or more modules of electrochemical cells. For example, lithium-ion cells can be used. The battery 114 can be controlled by a battery management unit (BMU) 116. For example, the BMU 116 can manage the state of charge of the battery 114, and open and close the contactors between the battery 114 and the inverter 108. The battery 114, which is the energy source for vehicle propulsion, can be referred to as a high-voltage battery to distinguish it from a low-voltage (e.g., 12 V) battery that can power one or more components (e.g., the MCU board 110).

The vehicle 100 includes a vehicle control unit (VCU) 118. The VCU 118 can control the operational state of the vehicle 100. In some implementations, the VCU 118 can be coupled to both the BMU 116 and the MCU board 110. For example, the VCU 118 can coordinate torque requests for operation of the permanent magnet motor 102, such as based on a driver depressing an accelerator pedal. Using the approaches described herein, such torque requests can be adjusted in order to attenuate vibration of vibrational orders associated with operation of the permanent magnet motor.

The vehicle 100 includes a sensor 120 that can indicate a rotational position of the rotor in the permanent magnet motor 102. In some implementations, the sensor 120 can be mounted to a shaft of the rotor, and can give angle measurements. Using these angle measurements, the MCU 106 can determine rotational speed of the motor. For example, the sensor 120 can include analog circuitry (e.g., a resolver) or digital circuitry (e.g., an encoder) to determine rotational speed.

The vehicle 100 can execute a motor control strategy during operation of (e.g., when driving) the vehicle 100. This motor control strategy can include attenuating orders of vibration associated with operation of the permanent magnet motor 102. In implementations, orders of vibration are artifacts of operation of a motor, e.g., rotation of the motor, and depend on the design and operating characteristics of the motor. That is, motors of the same design will generally have the same orders of vibration.

Such orders of vibration can be assigned respective numerical designations, where the numerical designation for a given vibrational order indicates the number vibration inducing events associated with that vibrational order that occur per rotation, or revolution of the motor. That is, for the permanent magnet motor 102, a vibration inducing artifact associated with a first-order vibration would occur once per revolution of the permanent magnet motor 102's rotor, an artifact associated with a second-order vibration would occur twice per revolution of the rotor, and so forth. In example implementations, the vibrational orders of a given motor can be independent of a direction of rotation of the motor's rotor. That is, orders of vibration can occur when propelling an associated EV in both forward and reverse.

A given motor, such as the permanent magnet motor 102, can have multiple orders of vibration that result from different operational and/or design aspects of the motor. As an example, the permanent magnet motor 102 can have an order of vibration that is a result of, or associated with cogging torque. Cogging torque occurs in electric motors due to interaction between permanent magnets of the rotor and stator slots of the motor. Specifically, cogging torque is a result in permutations in magnetic fields produced by the stator due to its slots. Cogging torque is dependent on the angular position of the rotor relative to the stator, and its periodicity per revolution (e.g., numerical vibrational order designation) depends on a number of magnetic poles and the number of slots on the stator. Cogging torque can cause shuddering or jerkiness, as well as speed ripple in the operation of an electric motor, and can be especially pronounced at low speeds and low torque. Accordingly, cogging torque is an undesirable consequence of the operation of electric motors used in EVs, as it can be perceived by occupants of the vehicle. Using the approaches described herein, cogging torque can be attenuated, which can reduce and/or eliminate the resulting vibration that is perceived by vehicle occupants.

In implementations of the vehicle 100 of FIG. 1, another source of orders of vibration can be the production of AC for the stator of the permanent magnet motor 102 using the three-phase inverter 108. Such orders of vibration can result, for example, in an occupant-perceivable speed ripple, particularly when the permanent magnet motor 102 is heavily loaded, such as when using the permanent magnetic motor 102 to decelerate the vehicle 100 on a downward slope. Such vibrational orders may correlate with an electrical harmonic resulting from operation of the motor. For instance, a four-pole motor (e.g., four magnetic poles) in which three-phase AC is used to generate torque can have a twelfth order vibration. There can also be associated vibrational orders at higher orders, or related electrical harmonics, e.g., such as for the twelfth order vibration, a twenty-fourth order vibration, a forty-eighth order vibration, and so forth can occur. Such higher orders of vibration, in example implementations, may be less perceptible to vehicle occupants and therefore, in some implementations, attenuation of these higher vibrational orders can be omitted, though the exact approach can vary based on the particular implementation and motor.

FIG. 2 shows an example method 200 for vibrational order attenuation that can be performed by the motor controller of the vehicle in FIG. 1. The method 200 can, for instance, be implemented by software, hardware, and/or firmware that is included in the MCU 106 of the vehicle 100. Accordingly, for purposes of discussion and illustration, the method 200 will be described with further reference to FIG. 1. Likewise, the examples of FIGS. 3-5 can also be implemented in the vehicle 100 (e.g., by software, hardware and/or firmware included in the MCU 106) and will also be described with further reference to FIG. 1.

In the method 200, at operation 202, based on present operating conditions of the vehicle 100 (e.g., a present speed of the permanent magnet motor 102, an amount of torque requested from the VCU 118, etc.), the likely occurrence of a given order of vibration can be detected and an attenuation signal for dampening the effects of the detected order of vibration can be produced. For instance, the operation 202 can include referencing one or more lookup tables. For example, a first lookup table can be referenced based on the present operating conditions to detect or determine the vibrational order to be attenuated, and a second lookup table can be indexed based on the detected vibrational order to identify an attenuation signal to be applied to dampen the effects of the detected vibrational order.

At operation 204, a torque command, e.g., a user torque command from the VCU 118, can be adjusted based on the attenuation signal of operation 202. For instance, the attenuation signal can added to the torque command signal from the VCU 118. At operation 206, the adjusted torque command can be applied, by the MCU 106, to control the permanent magnet motor 102.

FIG. 3 shows an example method 300 for attenuation of multiple orders of vibration that can be performed by the MCU 106 of the vehicle 100 in FIG. 1. In some implementations, the approach shown in FIG. 3 can implement the method 200 of FIG. 2 to determine an adjusted torque command. As shown in FIG. 3, a plurality of different vibrational orders can each be each be detected and attenuated by respective vibrational order detection and attenuation controllers (controllers) 302a and 302b. While only two controllers 302a and 302b are shown, as indicated in FIG. 3, additional controllers for attenuating different orders of vibration can be included in the method 300. As shown in FIG. 3, each of the controllers 302a and 302b can provide an attenuation signal (e.g., for attenuating a respective vibrational order) to a summation block 306. The summation block 306 can also receive an accelerator torque command signal, e.g., from the VCU 118 in the vehicle 100. The summation block 306 can combine (sum) the attenuation signals provided by the controllers 302a and 302b with the accelerator torque command 306 to produce an attenuated torque command signal as an output, and that attenuated torque command signal can be used by the MCU 106 to control operation of the permanent magnet motor 102.

In example implementations, the controllers 302a and 302b (as well as other controllers corresponding with additional vibrational orders) can be implemented using the example of FIG. 4. Further, such vibrational order detection and attenuation controllers can each be selectively (and individually) enabled and disabled using the example approach of FIG. 5. In such implementations, if a given vibrational order detection and attenuation controller is disabled, it will not provide an attenuation signal (e.g., will provide a zero signal) and will not contribute to, or result in any adjustment of, the accelerator torque command signal for its respective vibrational order. In other words, in the example of FIG. 3, only vibrational order detection and attenuation controllers (e.g., of the controllers 302a to 302b) that are enabled will contribute to adjustment of the accelerator torque command 304 at the summation block 306.

In some implementations, multiple vibrational order detection and attenuation controllers can be enabled at the same time. That is, in such implementations, there can be overlap in the attenuation of different vibrational orders, resulting in coincident attenuation of those different orders of vibration. Referring to the examples above, the controller 302a can be configured to attenuate for a vibrational order associated with cogging torque, while the controller 302b can be configured to attenuate for a vibrational order associated with producing AC by the inverter 108. In this example, both controllers 302a and 302b can be enabled at the same time, which will result in two attenuation signals, one from each of the controllers 302a and 302b, being combined with the accelerator torque command signal 304 at the summation block 306.

FIG. 4 shows an example 400 of a motor control process that can be performed by the MCU 106 of the vehicle 100 in FIG. 1 to attenuate vibration associated with an order of vibration. As noted above, the example 400 can be used to implement each of the controllers 302a to 302b. That is, the process of example 400 can be separately performed by a respective vibrational order detection and attenuation controller for each vibration order to be attenuated, e.g., during operation of the vehicle 100.

In the example 400, the upper portion of the diagram (operations 402 to 414) achieves detection of a vibrational order of interest and passes that detected vibrational order to a proportional derivative loop (operations 416 to 422) in the lower portion of FIG. 4. In example implementations, the proportional derivative loop in FIG. 4 can implement a disturbance rejection loop with a reference of zero (e.g., the desired peak-to-peak amplitude of vibration associated with vibrational orders being attenuated).

As shown in FIG. 4, with further reference to FIG. 1, at operation 402 a present speed of the permanent magnet motor is determined or provided (e.g., based on angle measurements from the sensor 120). At operation 403, a second-order low-pass filter can be applied to a signal indicating the present speed. The second-order low pass filter can filter unwanted elements of the present speed, such as electric noise or signal elements due to driveline dynamics. At operation 404, an absolute value of the motor speed is determined (e.g., from the second-order low-pass filtered signal indicating the present speed) to account for attenuating vibrational orders when the vehicle 100 is being propelled in both forward and reverse. At operation 408, the absolute value of the motor speed from operation 404, along with an order of vibration to be attenuated 406 are used to calculate a frequency corresponding to the vibrational order of interest, where the calculated frequency can be provided to a notch filter 410. The frequency, in hertz (Hz), of operation 408 can be calculated using the equation below:

$$\text{Frequency of vibrational order (Hz)} = \frac{\text{Motor speed } (RPM) * \text{Order to be attenuated}}{60}.$$

In example implementations, a depth (e.g., attenuation in dB) and width (e.g., a range of frequencies) of a notch applied by the notch filter 410 can be based on fixed and/or adaptive parameters, that are based on, and/or determined from the frequency calculated at operation 408. In implementations using adaptive parameters, convergence routines can be implemented (e.g., by the MCU 106) to determine operating parameters for the notch filter 410. For example, an adaptive filter strategy could be used where, initially, a vibrational order of interest can be characterized using a recursive, real-time characterization process. After this characterization process, parameters determined by the characterization can be applied to a corresponding adaptive filter, or filters. For instance, a least mean squares filter could be implemented using such a filter strategy. In some implementations, the order of vibration 406 can be calibratable (e.g., selectable or changeable). Accordingly, the example of FIG. 4 can be used for vibrational order attenuation in different motor variants (e.g., motors with different designs, and/or motors having different perceivable orders of vibration).

In this example, the notch filter 410 is used to implement a bandpass filter that is applied to the absolute speed of the motor from operation 404. In this example, at operation 412, the output of the notch filter 410 is subtracted from the absolute speed of the motor, such that only signals associated with absolute motor speeds that correspond with the vibrational order of interest 406 (e.g., the vibrational order to be attenuated based on the frequency calculated at operation 408) get passed, at operation 414, to the proportional derivative loop of the example 400.

As shown in FIG. 4, signals passed from the operation 414 are provided to a proportional gain operation 416 and a derivative gain path including operations 418 and 420. In the example 400, the output of the operation 414 is proportional to motor speed (e.g., the gain at operation 416 is applied to the motor speed provided by operation 414). Further in the example, 400, at operation 418, a derivative of the provided motor speed signal provided by operation 414 can be determined, providing a motor acceleration (or deceleration) value, and a derivative gain can be applied at operation 420 to produce a value that is proportional to motor acceleration. The values of operations 416 and 420 can then be combined (summed) at operation 422, and the summed signal can be used, at operation 424, to provide an attenuation signal that can be combined with a torque command signal, as described herein, to attenuate vibration associated with the vibrational order 406.

The example 400 can be referred to as a feedback controller. In this example, as the motor speed (and associated acceleration/deceleration) changes, the attenuation signal provided by operation 424 will also correspondingly change. In an example, an attenuation signal generated at the operation 424 can be in the form of a sinusoid that is added to a user torque command (e.g., a torque command from the VCU 118 in the vehicle 100). That is, the sinusoidal attenuation signal can be overlaid on the torque command signal. The attenuation signal can, in this example, damp out oscillations (vibration) associated with the vibration order 406 by adjusting inertia of a rotor in a corresponding electric motor. That is, the feed forward controller of FIG. 4 can be configured to damp out vibration, with a reference of zero peak-to-peak amplitude. That is, the proportional gain act as a damper on rotor speed, while the derivative gain adds inertia to the rotor, thus producing a sinusoidal attenuation signal.

Figure 5:
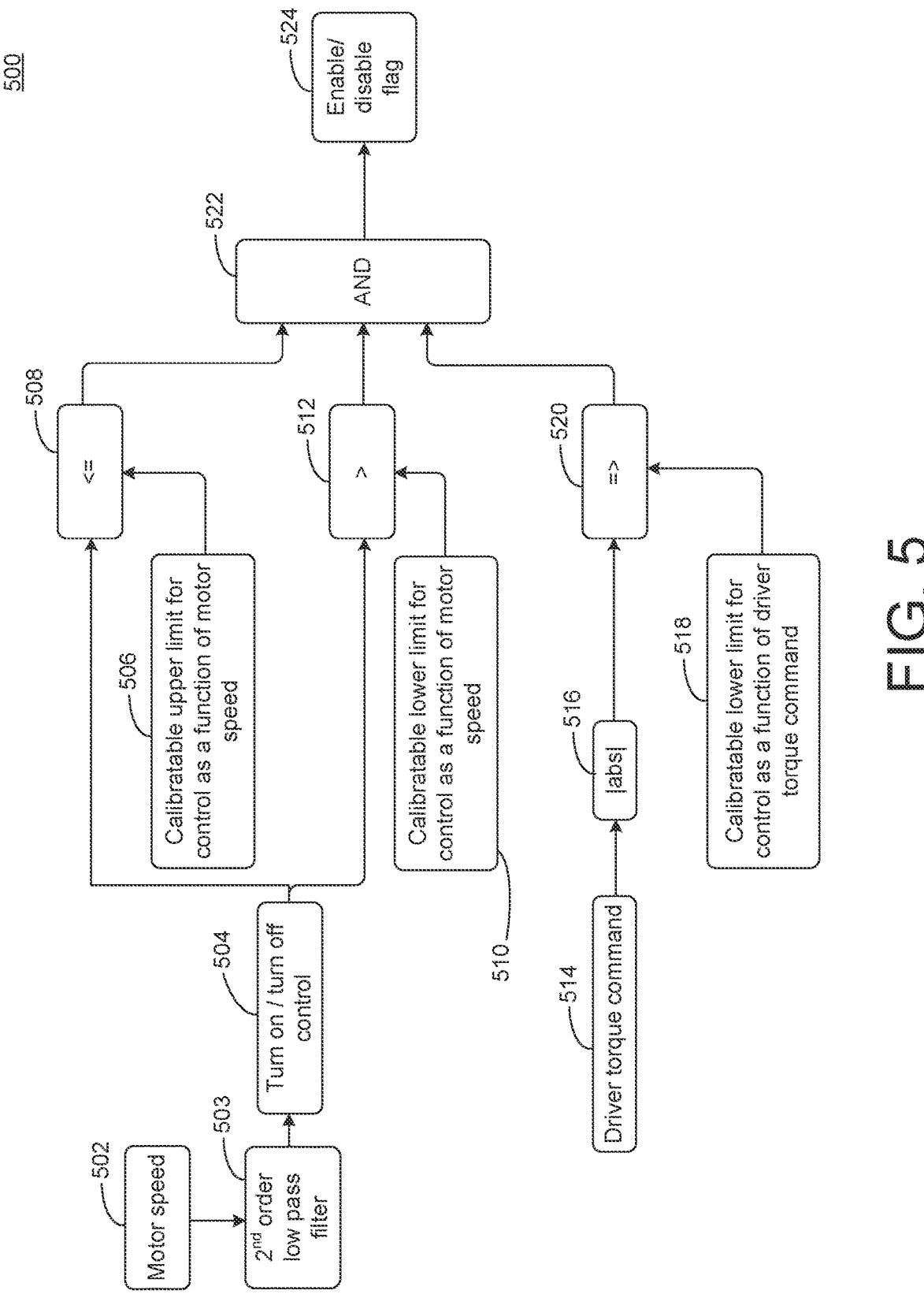
FIG. 5 shows an example of a motor control process that can be performed by the motor controller of the vehicle in FIG. 1 to enable or disable attenuation of a vibrational order.

FIG. 5 shows an example 500 of a motor control process that can be performed by the motor controller of the vehicle in FIG. 1. That is, the process of FIG. 5 can be used to selectively enable or disable attenuation of vibrational orders. In some implementations, the process of FIG. 5 can be implemented in conjunction with the process of FIG. 4. In such approaches, the process of FIG. 5 can be used to enable or disable the proportional derivative controller of the process of FIG. 4 (e.g., in electric vehicle implementations, such as the vehicle 100 of FIG. 1) based on vehicle speed and an amount of torque requested by a driver of the vehicle, e.g., torque requested by the VCU 118 based on depression of an accelerator pedal by a driver. That is, the process of FIG. 5 can be used to enable/disable attenuation of an order of vibration based on present vehicle operating conditions (e.g., by enabling/disabling an associated proportional derivative controller based on those operating conditions).

Referring to FIG. 5, in this example, at operation 502 a motor speed is provided, which can be an absolute value of the speed of an electric motor, such as described herein. At operation 503, a second-order low-pass filter can be applied to a signal indicating the present speed. The second-order low pass filter can filter unwanted elements of the present speed, such as electric noise or signal elements due to driveline dynamics. At operation 504, turn on and/or turn off of the process of FIG. 4 can be controlled based on the filtered signal from operation 503. For instance, in example implementation, slew rate control or a filter can be used to regulate turn on and/or turn off. In one example, another second order low pass filter can be used. Such turn on/turn off control can prevent an associated proportional derivative controller from rapidly turning on and off when a vehicle is operating at or near the thresholds applied in the process of FIG. 5, such as those thresholds (limits) described below. Such rapid turn on and turn off is undesirable as it could create artifacts (e.g., jerkiness, shuddering, etc.) that are perceivable by vehicle occupants.

As shown in FIG. 5, the filtered motor speed from the operation 504 is compared, at operation 508, with an upper motor speed limit 506, which can be calibrated (e.g. based on a corresponding order of vibration for which attenuation is being enabled or disabled). In this example, the operation 508 determines if the filtered motor speed is less than or equal to the upper motor speed limit 506. Similarly, the second-order filtered motor speed from the operation 504 is compared, at operation 512, with a lower motor speed limit 510, which can also be calibrated (e.g. based on the corresponding order of vibration for which attenuation is being enabled or disabled). The operation 512 determines if the filtered motor speed is greater than or the lower motor speed limit 506. Also, at operation 514 in FIG. 5, a driver torque command (e.g., from a VCU) is provided and, at operation 516, an absolute value of the driver torque command is determined. At operation 520, the absolute value of the driver torque command from the operation 516 is compared with a torque request limit 518 to determine if the absolute value of the driver torque command is greater than or equal to the torque request limit. As indicated in FIG. 5, the torque request limit 518 can also be calibrated (e.g. based on the corresponding order of vibration for which attenuation is being enabled or disabled).

In the example process of FIG. 5, if all three conditions of operations 508, 512 and 520 are met (e.g., motor speed is between the two motor speed limits 506 and 510, and requested torque is greater than or equal to the torque request limit 518), an AND operation 522 will generate a logic high signal (e.g., a logic 1, a true signal, etc.), enabling an associated proportional derivative controller to attenuate vibration from a corresponding order of vibration. If any of the conditions are not met, the AND operation 522 will generate a logic low signal (e.g., a logic 0, a false signal, etc.), disabling the associated proportional derivative controller.

In example implementations, use of the process of FIG. 5 to enable and disable proportional derivative controllers for attenuating vibration associated with vibrational orders of an electric motor can reduce switching (e.g., prevent unneeded switching) in an inverter used to generate AC that is provided to the motor to produce torque. This can, in turn, reduce energy (e.g., battery charge) consumption by the motor, which can increase overall efficiency of the motor, preventing reductions in a driving range achievable on a given amount of battery charge (e.g. preventing reduction of vehicle range due to power losses from such unneeded inverter switching).

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
applying, by a motor controller, a filter to a signal indicating rotational speed of an electric motor to detect an order of vibration of the electric motor to be attenuated;
providing the filtered signal to a proportional derivative controller;
generating, by the proportional derivative controller, an attenuation signal for attenuating vibration associated with the detected order of vibration;
combining the attenuation signal with a torque command signal to produce a combined torque command signal, the torque command signal indicating an amount of torque requested from the electric motor; and
producing torque with the electric motor based on the combined torque command signal.

2. The method of claim 1, wherein the proportional derivative controller is configured to implement a disturbance rejection loop with a zero reference.

3. The method of claim 1, wherein the signal indicating rotational speed of the electric motor indicates an absolute value of the rotational speed.

4. The method of claim 3, wherein applying the filter to the signal indicating rotational speed of the electric motor includes:
prior to determining the absolute value of the rotational speed, low-pass filtering the signal indicating rotational speed of the electric motor; and
after determining the absolute value of the rotational speed, notch filtering the signal indicating the absolute value of the rotational speed.

5. The method of claim 1, further comprising:
enabling the proportional derivative controller in response to:

the rotational speed being between a lower speed limit and an upper speed limit; and
an amount of torque requested by the torque command signal being greater than or equal to a threshold; and
otherwise, disabling the proportional derivative controller.

6. The method of claim 1, wherein the rotational speed of the electric motor is an absolute value of rotational speed.

7. A method comprising:
based on a rotational speed of an electric motor:
detecting a first vibrational order of the electric motor to be attenuated; and
detecting a second vibrational order of the electric motor to be attenuated;
based on the detection of the first vibrational order, producing a first attenuation signal for attenuating vibration associated with the first vibrational order;
based on the detection of the second vibrational order, producing a second attenuation signal for attenuating vibration associated with the second vibrational order;
combining the first attenuation signal and the second attenuation signal with a torque command signal to produce a combined torque command signal, the torque command signal indicating an amount of torque requested from the electric motor; and
producing torque with the electric motor based on the combined torque command signal.

8. The method of claim 7, further comprising:
disabling a first proportional derivative controller used to produce the first attenuation signal unless:
the rotational speed is between a first lower speed limit and a first upper speed limit; and
an amount of torque requested by the torque command signal is above a first threshold; and
disabling a second proportional derivative controller used to produce the second attenuation signal unless:
the rotational speed is between a second lower speed limit and a second upper speed limit; and
an amount of torque requested by the torque command signal is above a second threshold.

9. The method of claim 8, wherein at least one of the first proportional derivative controller, or the second proportional derivative controller is configured to implement a respective disturbance rejection loop with a zero reference.

10. A vehicle comprising:
an electric motor configured to generate a signal indicating a rotational speed of the electric motor;
a motor controller, including:
a filter configured to filter to the signal indicating rotational speed of an electric motor to produce a filtered signal used to detect an order of vibration of the electric motor to be attenuated; and
a proportional derivative controller configured to generate, based on the filtered signal, an attenuation signal for attenuating vibration associated with the detected order of vibration,
wherein:
the motor controller is configured to combine the attenuation signal with a torque command signal to produce a combined torque command signal, the torque command signal indicating an amount of torque requested from the electric motor, and
the electric motor is configured to produce torque based on the combined torque command signal.

11. The vehicle of claim 10, wherein the proportional derivative controller is configured to implement a disturbance rejection loop with a zero reference.

12. The vehicle of claim 10, wherein the filtered signal indicates an absolute value of the rotational speed.

13. The vehicle of claim 12, wherein the filter is configured to produce the filtered signal by:

prior to determining the absolute value of the rotational speed, low-pass filtering the signal indicating rotational speed of the electric motor; and after determining the absolute value of the rotational speed, notch filtering the signal indicating the absolute value of the rotational speed.

14. The vehicle of claim 10, wherein the motor controller is further configured to:

enable the proportional derivative controller in response to:

the rotational speed being between a lower speed limit and an upper speed limit; and an amount of torque requested by the torque command signal being greater than or equal to a threshold; and otherwise, disable the proportional derivative controller.

15. A vehicle comprising:

an electric motor configured to indicate a rotational speed;

a motor controller configured to:

based on the rotational speed:

detect a first vibrational order of the electric motor to be attenuated;

detect a second vibrational order of the electric motor to be attenuated;

based on the detection of the first vibrational order, produce a first attenuation signal for attenuating vibration associated with the first vibrational order;

based on the detection of the second vibrational order, produce a second attenuation signal for attenuating vibration associated with the second vibrational order; and combine the first attenuation signal and the second attenuation signal with a torque command signal to produce a combined torque command signal, the torque command signal indicating an amount of torque requested from the electric motor, wherein the electric motor is configured to produce torque based on the combined torque command signal.

16. The vehicle of claim 15, wherein the motor controller is further configured to:

disable a first proportional derivative controller used to produce the first attenuation signal unless:

the rotational speed is between a first lower speed limit and a first upper speed limit; and an amount of torque requested by the torque command signal is above a first threshold; and disable a second proportional derivative controller used to produce the second attenuation signal unless:

the rotational speed is between a second lower speed limit and a second upper speed limit; and an amount of torque requested by the torque command signal is above a second threshold.

17. The vehicle of claim 16, wherein at least one of the first proportional derivative controller, or the second proportional derivative controller is configured to implement a respective disturbance rejection loop with a zero reference.

18. The vehicle of claim 15, wherein the motor controller is further configured to determine an absolute value of the rotational speed prior to determining the first vibrational order and the second vibrational order.

* * * * *